(12) United States Patent
Maurer et al.

(10) Patent No.: US 8,783,139 B2
(45) Date of Patent: Jul. 22, 2014

(54) STEADY REST

(75) Inventors: Eckhard Maurer, Oberteuringen (DE);
Jürgen Marquart, Markdorf (DE);
Robert Scheming, Markdorf (DE)

(73) Assignee: SMW-AUTOBLOK Spannsysteme GmbH, Meckenbeuren (DE)

( * ) Notice: Subject to any disclaimer, the term of this patent is extended or adjusted under 35 U.S.C. 154(b) by 188 days.

(21) Appl. No.: 13/507,457

(22) Filed: Jun. 29, 2012

(65) Prior Publication Data
US 2013/0047804 A1 Feb. 28, 2013

(30) Foreign Application Priority Data

Jul. 1, 2011 (EP) ..................................... 11172350

(51) Int. Cl.
*B23Q 1/76* (2006.01)
*B23B 25/00* (2006.01)

(52) U.S. Cl.
USPC .................................. 82/162; 82/164; 82/157

(58) Field of Classification Search
CPC .......... B23Q 1/76; B23Q 1/00; B23B 13/126; B23B 25/00; B23B 29/16; B24B 41/065
USPC .................... 82/162, 164, 157; 451/408, 406; 409/225
See application file for complete search history.

(56) References Cited

U.S. PATENT DOCUMENTS

| | | | | | |
|---|---|---|---|---|---|
| 2,160,378 | A | * | 5/1939 | Balsiger | 451/11 |
| 3,736,114 | A | * | 5/1973 | Okada | 451/407 |
| 4,276,723 | A | * | 7/1981 | Fournier | 451/408 |
| 4,399,639 | A | * | 8/1983 | Lessway | 451/408 |
| 5,525,017 | A | * | 6/1996 | Asada | 409/197 |
| 6,505,533 | B2 | * | 1/2003 | Kroisandt | 82/53 |

FOREIGN PATENT DOCUMENTS

| | | |
|---|---|---|
| EP | 0 554 506 | 8/1993 |
| EP | 2191932 | 6/2010 |
| GB | 2089708 | 6/1982 |

* cited by examiner

*Primary Examiner* — Will Fridie, Jr.
(74) *Attorney, Agent, or Firm* — Pandiscio & Pandiscio

(57) ABSTRACT

A steady rest for centering a rotationally symmetrical workpiece in a housing, a guide slide axially adjustable in the housing, an actuator rod in a form-locking connection with the guide slide, and two control surfaces opposite one-another on the guide slide and configured so that the guide slide has a triangular cross-sectional contour, one tip pointing towards the workpiece and the opposite two tips point in toward the actuator rod, a middle steady rest arm in driving connection with the actuator rod, and two outer steady rest arms each on a side next to the middle steady rest arm, and mounted in a swivelling arrangement in the housing, the first free end of which is in contact with a control surface of the guide slide, the second free end gripping the workpiece, forming a three-point mounting with the middle steady rest arm adapted to hold the workpiece.

10 Claims, 15 Drawing Sheets

STEADY REST

BACKGROUND OF THE INVENTION

1. Field of the Invention

The present invention relates to a steady rest for centering a rotationally symmetrical workpiece in a space.

2. Description of the Prior Art

Steady rests of this kind have been used for decades for supporting rotationally symmetrical workpieces on machines tools. In particular with heavy and long rotationally symmetrical workpieces, it is necessary to secure them centrally in the space by means of one or more steady rests spaced apart from one another in order to prevent the bowing of the workpiece. The workpieces undergo bowing under their own weight, especially when they are rotating for machining involving metal cutting.

In the course of a plurality of machining steps, furthermore, additional machining forces are created which act on the workpieces and by means of which the central positioning of the workpiece can be changed. The steady rests of prior art are therefore intended to prevent the machining forces which act on the workpieces from giving rise to positional changes of this kind.

Machining involving metal cutting reduces the weight of the workpieces, as a result of which there is often also a change in position with the effect that the steady rests have to be reopened after a particular reduction in the weight of the workpieces in order to position the workpieces in the space so that the lengthways axis of the clamped workpiece runs along a straight line without deviating from a central axis.

A steady rest with an internal adjustment device for the central axis of the workpieces is disclosed in EP 0 554 506 B1. In order to achieve this, it is necessary for two outer steady rest arms to be moved differently in relation to one another in order to achieve the vertical alignment of the workpiece. Horizontal centering of the workpiece is performed jointly with all three steady rest arms, which come into working contact with the workpiece simultaneously or at different times from one another.

EP 0 554 506 B1 proposes an adjustment device for vertical and horizontal alignment of steady rest arms which has an extremely complex design.

It has proven to be a disadvantage of an adjustment device of this kind that it has to be opened in order to centre the workpiece. Following this, the stop points of the three steady rest arms must be changed depending on the necessary positional shift of the workpiece in space.

After this, the three steady rest arms grip the workpiece again and hold it.

Although this state of the art has proven effective for adjusting the feed movement of the steady rest arms, it is however necessary to open the steady rest arms with the effect that the clamping forces of the steady rest no longer act on the workpiece and this means that, in particular with heavy workpieces, there is a significant shift of position.

SUMMARY OF THE INVENTION

Therefore, it is the task of the present invention to provide a steady rest of the aforementioned type which guarantees that high machining forces are reliably supported without the central positioning of the workpiece in the space being changed by these forces, and that at the same time the centering of the workpiece in the space can be adjusted in a quick and easy way by changing the position of the steady rest arms, without the need for the contact of the three steady rest arms to be removed from the workpiece, as a result of which the spatial position of the workpiece can be adjusted as required when the workpiece is clamped.

Due to a passage opening having been worked into the actuator rod, it is possible to induce a force actuation element into the rod in order to permit a relative movement to take place between two adjustment devices, by means of which either the three steady rest arms can be adjusted jointly in order to move the workpiece horizontally and/or by means of which the control surfaces of the guide slide can be moved in a vertical direction synchronously with one another in order to achieve a vertical alignment of the workpiece. As a result of this, the workpiece can be centered not only horizontally, but also vertically, in the clamped condition; the clamping condition of the workpiece can thus be maintained.

Using two adjustment devices represents a particularly advantageous configuration, because it means that the workpiece can be aligned in two planes running at right angles to one another. However, it is possible for only one of the two adjustment devices to be connected in a steady rest.

It is particularly advantageous for the adjustment devices to be arranged spatially separated from one another in the housing cover, or in the housing shell, in order to provide mutually independent relative movements of the three steady rest arms or the guide slide in a vertical direction for changing the spatial position of the two outer steady rest arms, because this allows the clamped workpiece to be centered in a horizontal and/or vertical direction simultaneously or discretely.

A relative movement of this kind is achieved in that the force actuation element consists of two kidney-shaped mouldings that are firmly connected together, run opposite to and intersecting one another, and face towards the housing shell or the housing cover, with the effect that the adjustment devices are in a driving active connection with the force actuation element via intermediate elements, as a result of which slight movements of the adjustment devices can be transferred to the force actuation element and are passed from these either to the three steady rest arms for joint horizontal adjustment or to the guide slide for vertical alignment of the outer steady rest arms, with the effect that the corresponding force components of the adjustment devices are decoupled from one another.

BRIEF DESCRIPTION OF THE DRAWINGS

The drawings shows a sample embodiment of a steady rest configured in accordance with the present invention, the details of which are explained below. In the drawings.

DESCRIPTION OF THE PREFERRED EMBODIMENTS

FIGS. 1 to 12 show a steady rest 1 for spatial centering of a workpiece 12 by means of three steady rest arms 6, 9 and 10. By this means, it should be possible to achieve a spatial position of the workpiece 12 by a vertical and/or horizontal shift of the steady rest arms 6, 9 and 10 in the clamped condition of the workpiece 12, i.e. when the steady rest arms 6, 9 and 10 are firmly in contact with the outer jacket surface of the workpiece 12 and are securing it in the space. First of all, the design structure of the steady rest 1 is explained, followed by the setting options and the resulting mode of function of the steady rest 1.

Figure 1:
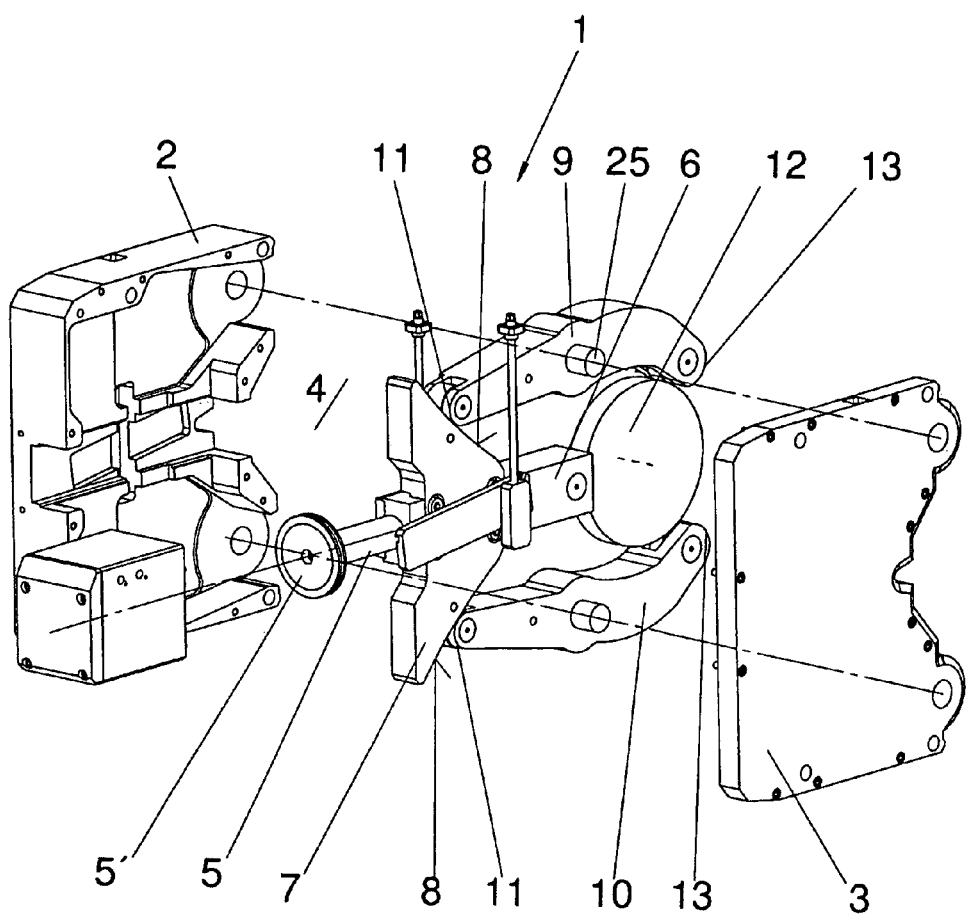
FIG. 1 shows a steady rest with a housing shell and a housing cover firmly connected, by means of which an internal space is formed in which an actuator rod in a driven active connection with three steady rest arms is in an axially adjustable arrangement in order to hold a workpiece centered in the space, in an exploded view with the housing cover in the foreground.
Figure 2:
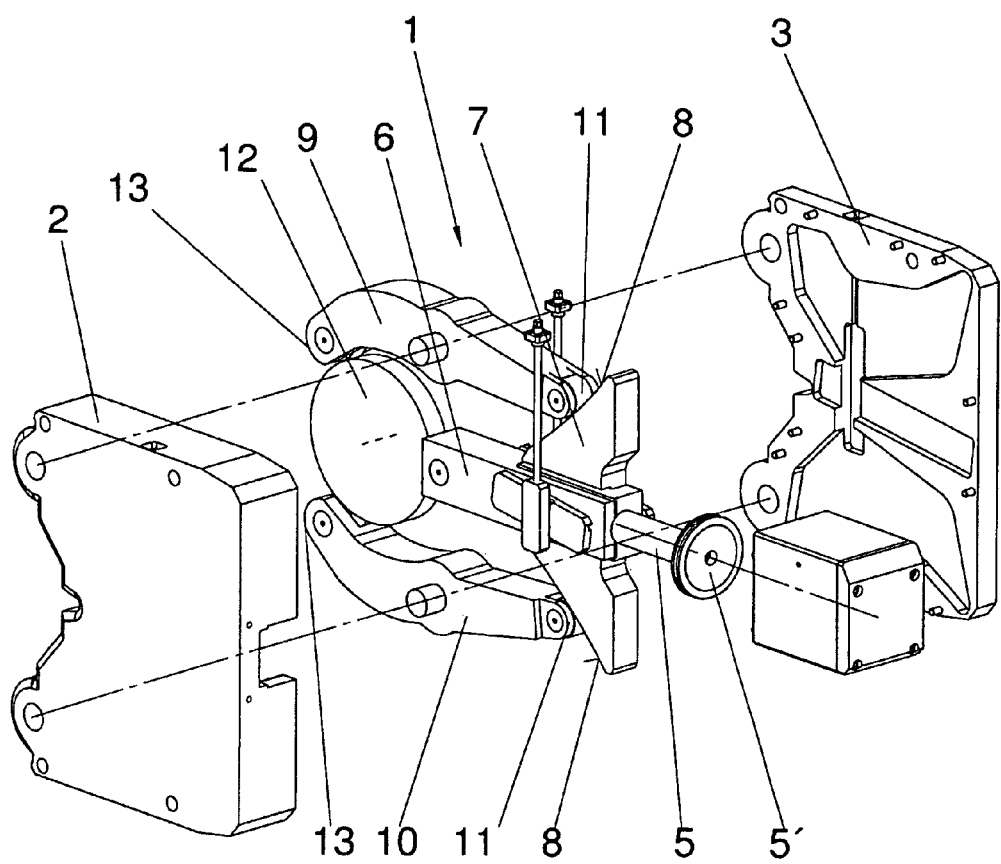
FIG. 2 shows the steady rest in accordance with FIG. 1, in an exploded view with the housing cover in the foreground.
Figure 3A:
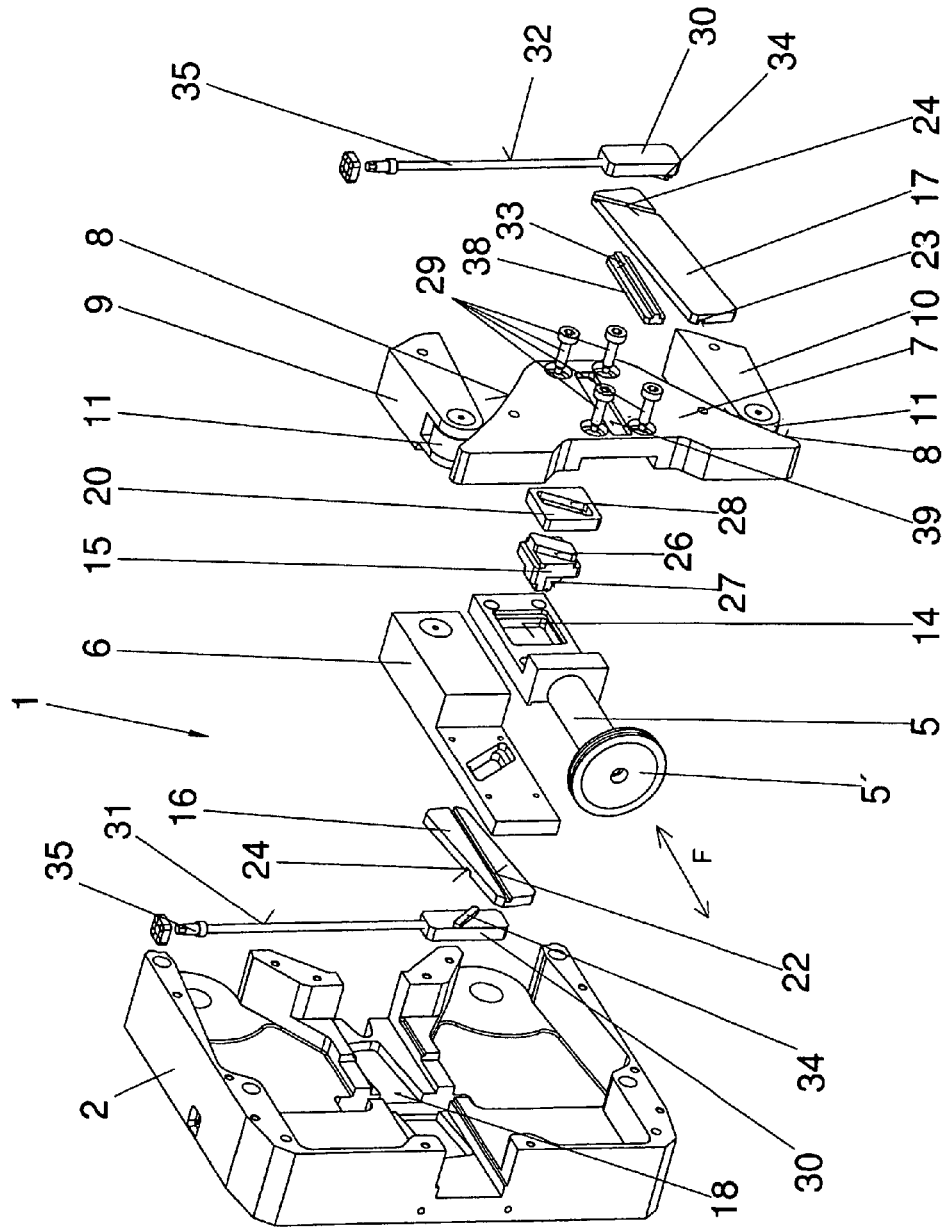
FIG. 3a shows an enlarged subsection of the steady rest in accordance with FIG. 1.

FIGS. 1, 2 and 3a show that the steady rest 1 consists of a housing shell 2 and a housing cover 3 that are connected together when assembled and by means of which an inner space 4 is formed. The inner space 4 has an actuator rod 5 arranged within it and located in an active connection with a pressure piston 5', as a result of which it can be moved axially back and forth in the housing shell 2 and the housing cover 3. As is explained in more detail below, the middle steady rest arm 6 is in a driving connection with the actuator rod 5 by means of intermediate elements.

Furthermore, a guide slide 7 is attached to the actuator rod 5 in a manner which shall be explained in more detail. The guide slide 7 has a chiefly triangular cross-sectional contour. One of the three points of the triangle faces towards the workpiece 12 to be clamped, while the two other points of the triangle in a shared axis face towards the actuator rod 5 with the effect that the axis formed by the two points of the triangle runs at right angles to the actuator rod 5. The two end faces on the sides of the guide slide 7 have a contour that serves as a control surface 8 for the two outer steady rest arms 9 and 10, because their free ends 11 facing the guide slide 7 are located in play-free contact with the corresponding control surface 8 of the guide slide 7.

Furthermore, the two outer steady rest arms 9 and 10 are mounted in a swivelling arrangement on the housing shell 2 and the housing cover 3 by means of an articulated pin 25, with the effect that during axial movement of the actuator rod 5 both the middle steady rest arm 6 and the two outer steady rest arms 9 and 10 are moved synchronously towards the workpiece 12 and make active contact with the outer jacket surface of the workpiece simultaneously. The further the actuator rod 5 is moved forward, the greater the clamping force exerted on the workpiece 12 by the three steady rest arms 6, 9 and 10.

The two outer steady rest arms 9 and 10 are mounted in a swivelling arrangement by means of the articulated pin 25, and the guide slide 7, like the middle steady rest arm 6, is advanced in a linear direction towards the workpiece, as a result of which the two outer steady rest arms 9 and 10 swivel about the articulated pin 25 towards the workpiece 12. In this case, the contours of the two control surfaces 8 on the guide slide 7 must be configured in such a way that the swivelling movements of the two outer steady rest arms 9 and 10 take place both synchronously with one another and synchronously with the middle steady rest arm 6; the distances covered by the middle steady rest arm 6 and by the two free ends 13 of the outer steady rest arms 9 and 10 pointing towards the workpiece 12 are different, with the effect that the linear feed speeds of the middle steady rest arm 6 and the guide slide 7 are identical, whereas the feed speed of the outer steady rest arms 9 and 10 is faster as a result of the control surface 8 when the feed distance of the outer steady rest arms 9 and 10 is longer than the feed distance of the middle steady rest arm 6. The corresponding physical/mathematical compensation for the adjustment movements are a result of the swivelling of the two outer steady rest arms 9 and 10 and is consequently achieved by the contour of the control surface 8.

Figure 3B:
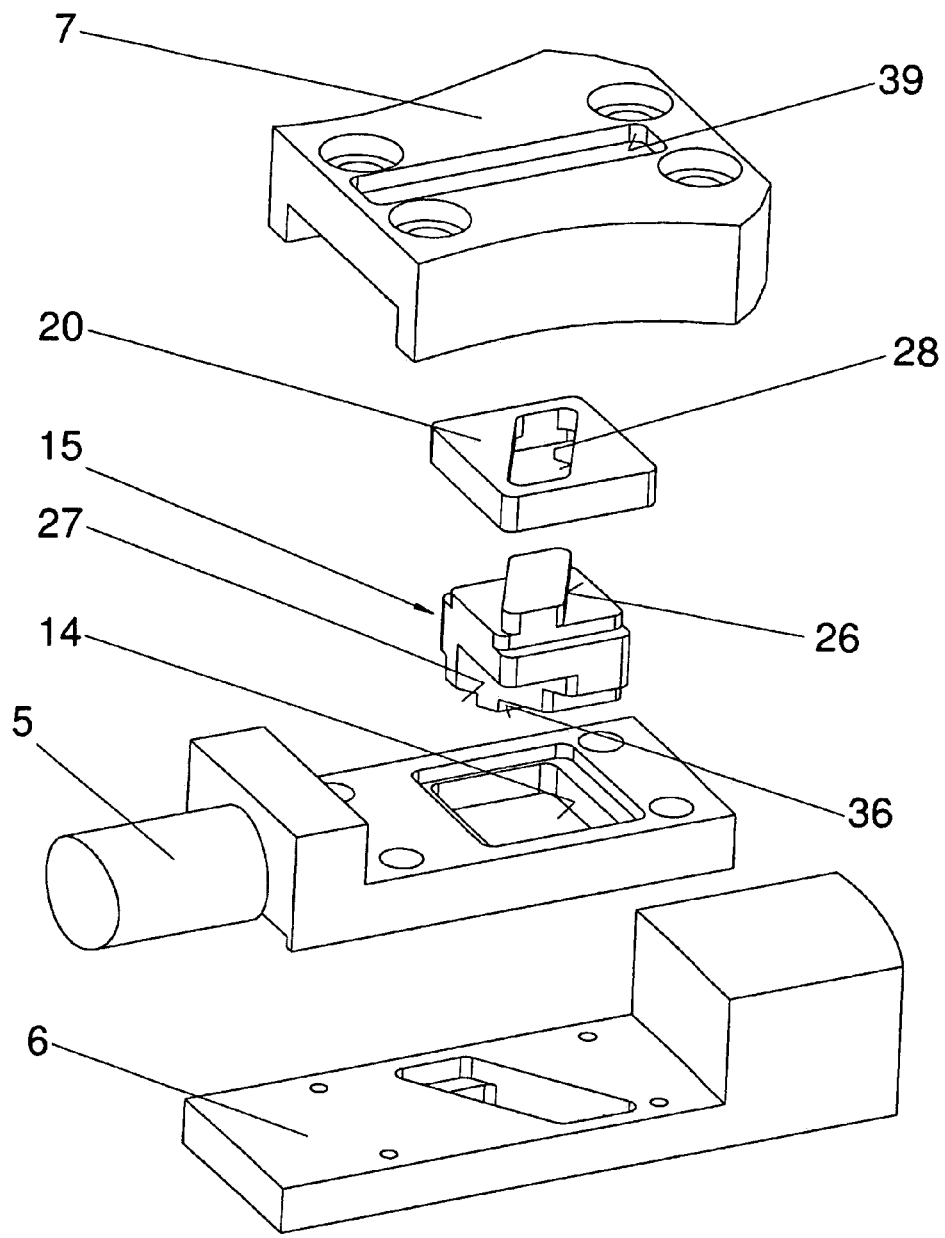
FIG. 3b shows the actuator rod and the middle steady rest arm of the steady rest in accordance with FIG. 1, in an exploded view.

FIG. 3b in particular shows that the actuator rod 5 has a passage hole 14 worked into it with a rectangular shaped internal contour. The passage hole 14 has a force transmission instrument 15 inserted into it, by means of which two adjustment forces offset at right angles are transmitted without the proportions of the two different adjusting forces exerting an alternating or mutually disruptive effect on one another. Rather, the adjusting forces exerted by a first and second adjustment device 31 and 32 that influence the spatial position of the workpiece 12 in the vertical and/or horizontal plane when the workpiece 12 is clamped should be able to act separately from one another on the workpiece 12 so as to achieve spatial centering of the workpiece 12.

The clamping force exerted on the actuator rod 5 by the pressure piston acts constantly both on the middle steady rest arm 6 and on the guide slide 7, and this also on the two outer steady rest arms 9, 10.

The force actuation element 15 is configured as a square block with a kidney-shaped moulding 26 or 27 formed on each of its two opposite end faces, in which case the mouldings run crossways in relation to one another and along the corresponding diagonals of the end face. The first kidney-shaped moulding 26 of the force actuation element 15 faces towards the guide slide 7 and the second kidney-shaped moulding 27 faces towards the housing shell 2.

FIG. 3a shows that a feed plate 20 is placed on the first kidney-shaped moulding 26 and the feed plate 20 has a groove 28 worked into it, the alignment of which is adapted to the track of the first moulding 26 of the force actuation element 15. However, the length of the groove 28 is longer than the lengthways extent of the moulding 26, with the effect that the feed plate 20 can be moved in the lengthways direction of the groove 28 relative to the force actuation element 15. The side walls of the groove 28 running parallel to the lengthways axis of the groove 28 are, however, located without play on the flanks of the moulding 26.

The feed plate 20 is inserted without play in an opening 21 that is worked into the guide slide 7, which is held on the actuator rod 5 by means of fastening screws 29.

Figure 4:
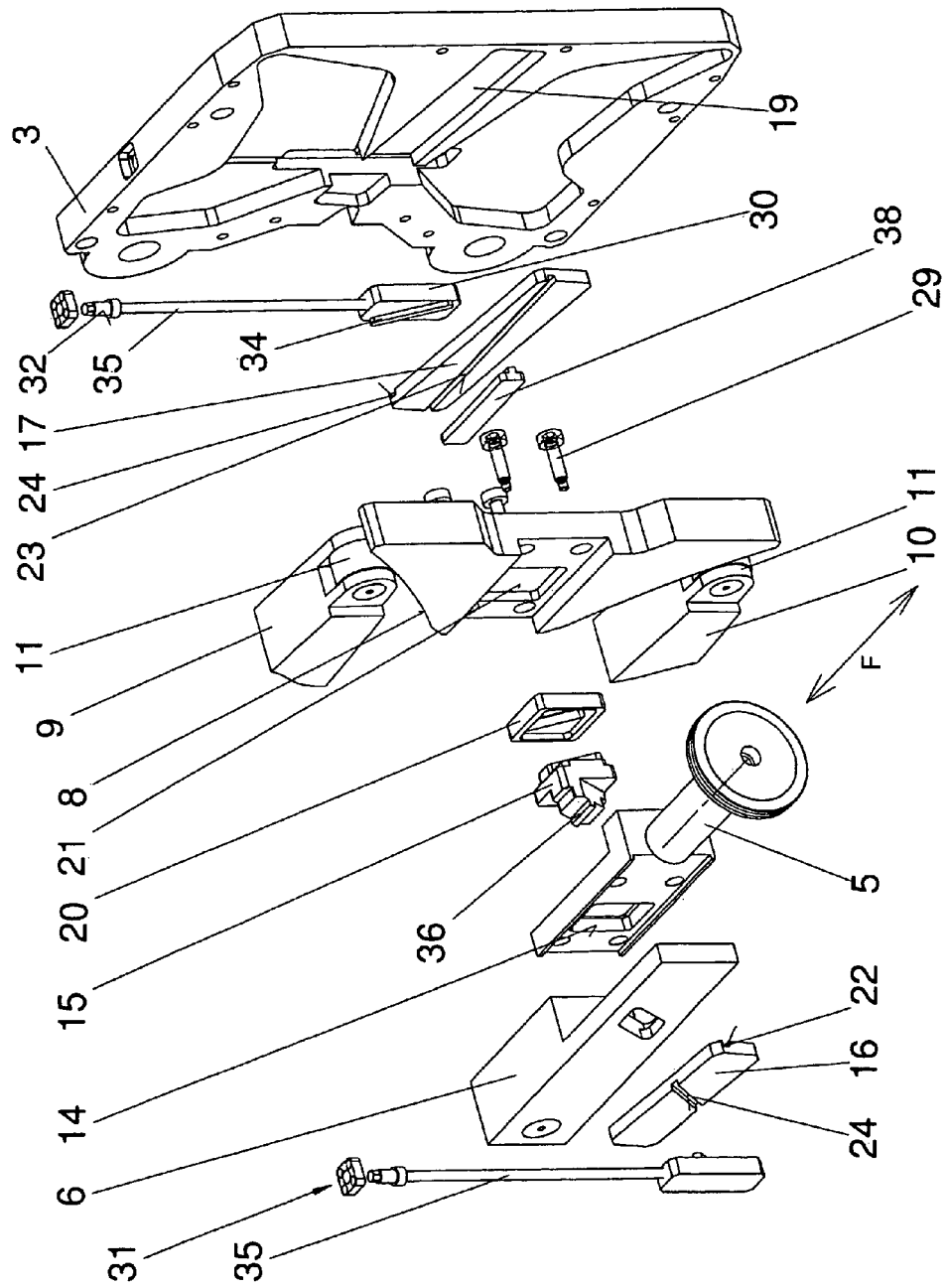
FIG. 4 shows an enlarged subsection of the steady rest in accordance with FIG. 2.
Figure 5A:
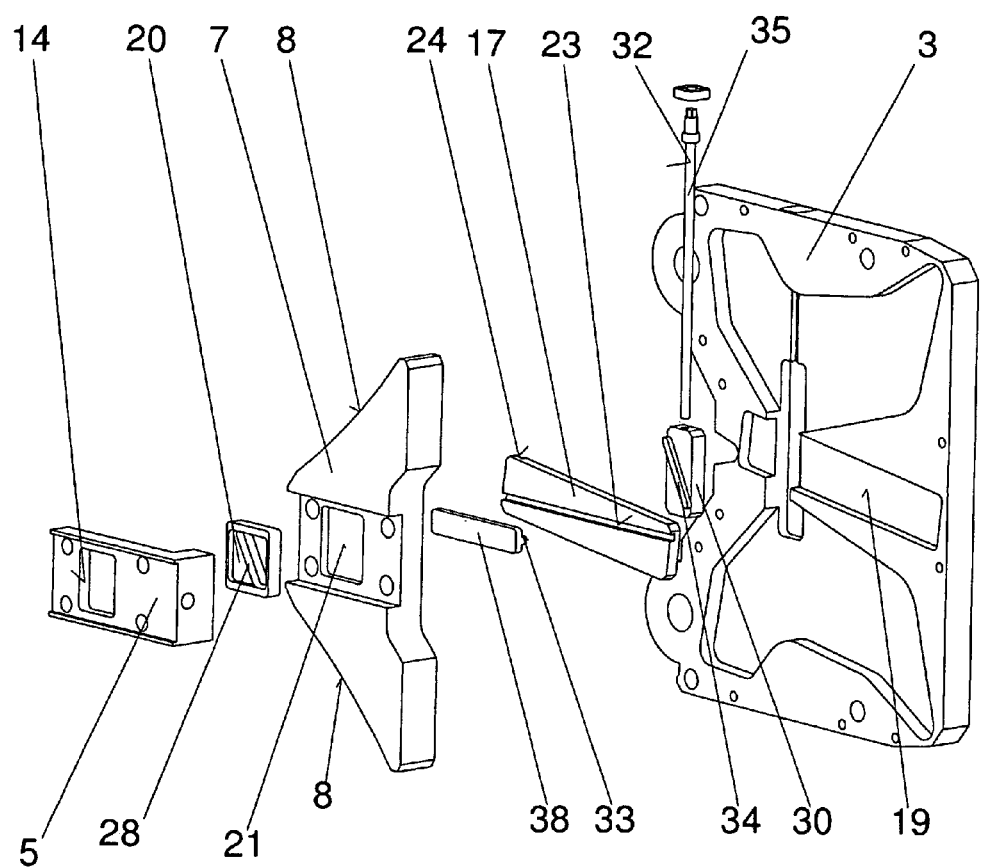
FIG. 5a shows a further enlarged subsection of the steady rest in accordance with FIG. 4.
Figure 5B:
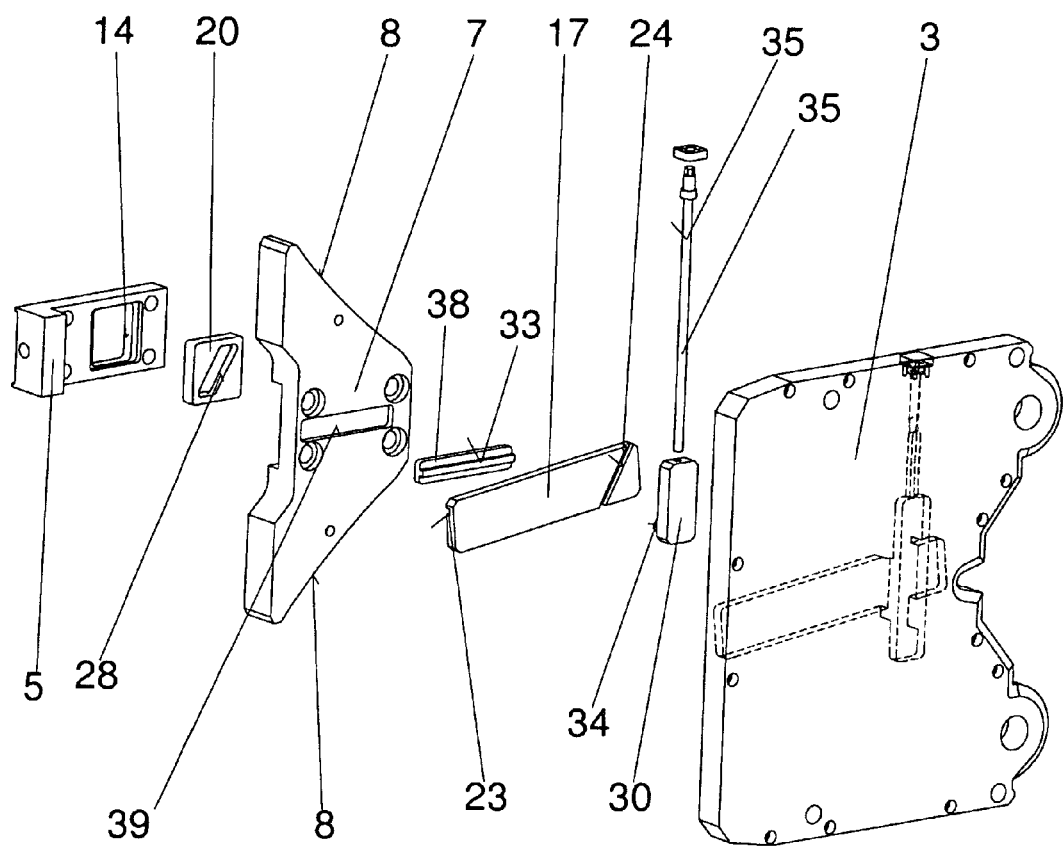
FIG. 5b shows an enlarged subsection of the steady rest in accordance with FIG. 2.

FIGS. 3b, 4 and 5a show by what constructive means the guide slide 7 interacts with the second vertical adjustment device 32, because the guide slide 7 has a guide groove 39 worked into it within which a guide plate 38 can be moved axially and is inserted without play in the vertical direction. A rail 33 is formed on the guide plate 38 facing away from the guide slide 7, with the rail 33 running in parallel to the horizontal plane in relation to the lengthways axis of the guide slide 7. The rail 33 can be moved axially in a guide groove 23 worked into a guide strip 17, and is mounted in the vertical direction without play. The guide strip 17 is installed at an angle of approx. 5° in a guide groove 19 worked into the housing cover, and is axially movable. The guide groove 23 provided in the guide strip 17 runs at an angle of 5° in a crossover or opposing angle to the angle position of the guide groove 19, with the effect that in the installed condition the rail 33 is moved in parallel to the lengthways axis and is in engagement with the guide strip 17 without play. A notch 24 angled out of the vertical plane is provided on the side of the guide plate 38 facing away from the guide strip 17, and the notch 24 runs at an angle of about 20° in relation to the vertical plane and in the direction of the workpiece 12.

The notch 24 in the housing cover 3 has an adjustment plate 30 with a kidney-shaped moulding 34 inserted in it which can be moved in the vertical direction in the housing cover 3 by means of an actuator rod 35, because the actuator rod 35 is accessible from the outside.

If the actuator rod 35 is moved accordingly in the vertical direction, then the helical gearing between the moulding 34 of the adjustment plate 30 and the guide strip 17 produces a shift in the vertical level, as a result of which the guide plate 38 is moved axially because of the angled arrangement of the rail 33, at the same time as being raised or lowered in relation to the horizontal plate, meaning that the guide slide 7 moves up or down, i.e. in the vertical direction. The movement of the guide slide 7 in the vertical direction causes the two outer steady rest arms 9 and 10 to undergo this movement of the guide slide 7 synchronously with one another, which has the effect that the spatial position of the workpiece 12 can be changed in the vertical plane, depending on the movement direction of the actuator rod 35. At the same time, the feed plate 20 slides along the moulding 26 with the effect that the vertical position change is not passed onto the force actuation element 15 and the actuator rod 5.

Figure 6A:
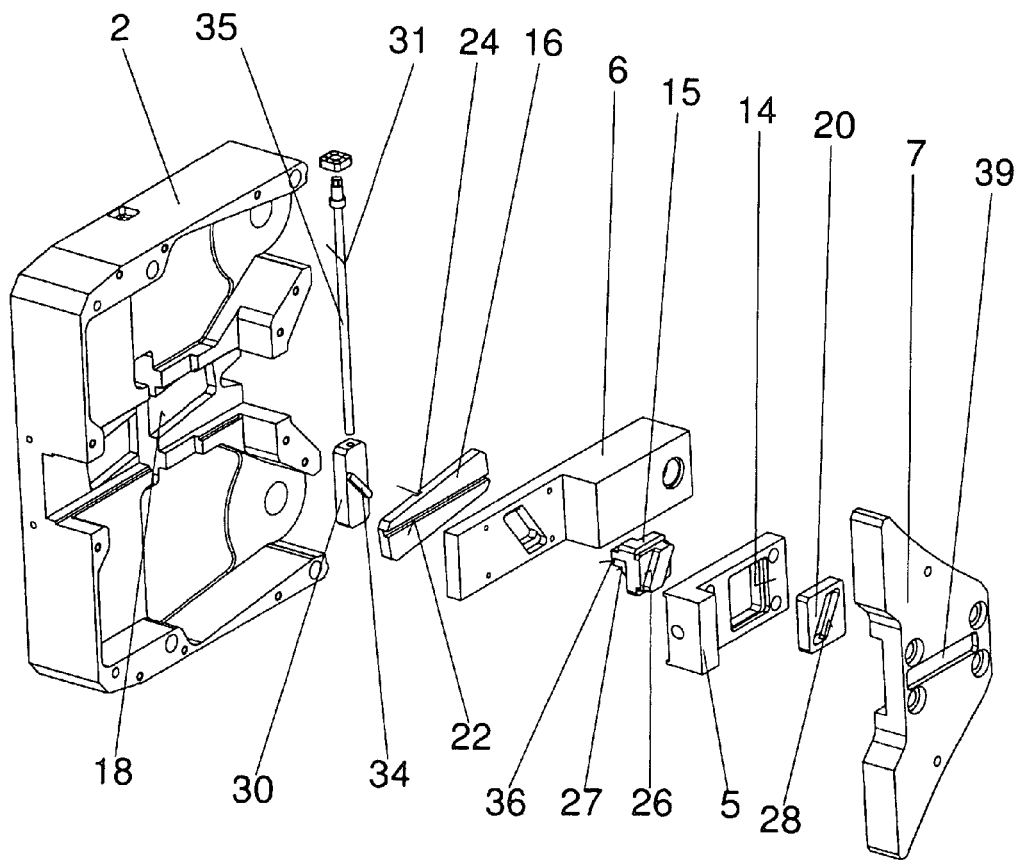
FIG. 6a shows an enlarged subsection of the steady rest in accordance with FIG. 1.
Figure 6B:
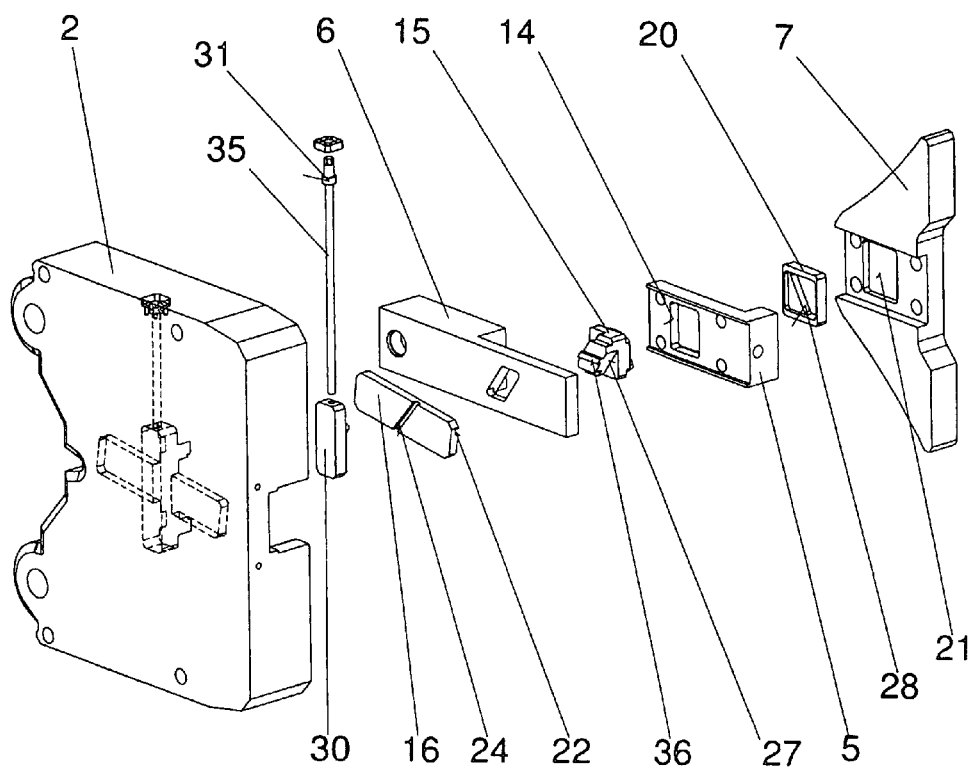
FIG. 6b shows an enlarged subsection of the steady rest in accordance with FIG. 2.

FIG. 6a shows the construction of the first adjustment device 31 for horizontal movement of the workpiece 12. A rail 36 running in the horizontal plane is also provided on the force actuation element 15 on the kidney-shaped moulding 27, in which case the spatial extent of the rail 36 is such that the rail 36 passes through the plane formed by the actuator rod 5 and projects beyond this in the direction of a further guide strip 16. The guide strip 16 that is adjacent to the housing shell 2 has a guide groove 22 worked into it, which is angled out of the horizontal plane by about 5°. In the installed condition, the guide strip 16 moves at an angle of about 5° in relation to the lengthways axis and engages with an adjustment plate 30 without play, because the guide strip 16 is installed in an axially adjustable arrangement in a guide groove 18 worked into housing shell 2 at an angle of about 5°. The guide groove 22 runs at an angle of about 5° in relation to the lengthways axis, in which case it runs at either a crossways or opposite angle to the arrangement of the guide strip 16 and/or the guide groove 18 in the housing shell, with the effect that according to FIG. 6a the movement of the guide groove 22 is parallel to the lengthways axis. A notch 24 is provided in the guide strip 16 on its end face that faces towards the guide groove 22, and the adjustment plate 30 with a moulding 34 is inserted into the notch 24.

The moulding 34 is angled about 20° out of the vertical plane, and faces towards the workpiece 12. The height of the adjustment plate 30 can be changed by means of the actuator rod 35 in an axially adjustable arrangement in the housing shell 2, with the effect that there is an axial movement of the guide strip 16 in the lengthways direction of the actuator rod 5 by means of the helical gearing between the moulding 34 and the notch 24.

As a result of the angled alignment of the guide groove 22 in the guide strip 16, the height of the force actuation element 15 is changed by means of the positive-locking active connection between the rail 36 formed onto it, with the effect that the force actuation element 15 is raised or lowered and the moment of contact of the middle steady rest arm 6, as well as the axial feed movement of the guide slide 7, are adjusted by means of the moulding 27, because the positions of the middle steady rest arm 6 and of the guide slide 7 can be changed slightly in the horizontal direction. When the workpiece 12 is clamped, this means that the middle steady rest arm 6 is moved slightly away from the workpiece 12, for example and, at the same time, the two outer steady rest arms 9 and 10 reach around the workpiece 12 at a point of contact located further away than the middle steady rest arm 6, and when the middle steady rest arm 6 is moved towards the workpiece, there is simultaneously a change in the points of contact of the two outer steady rest arms 9 and 10 on the workpiece 12 towards the middle steady rest arm 6, because the guide slide 7 is linked synchronously to the position shift of the middle steady rest arm 6 as a result of which the feed angles of the two outer steady rest arms 9 and 10 are adjusted and change in accordance with the movement of the guide slide 7.

Figure 7:
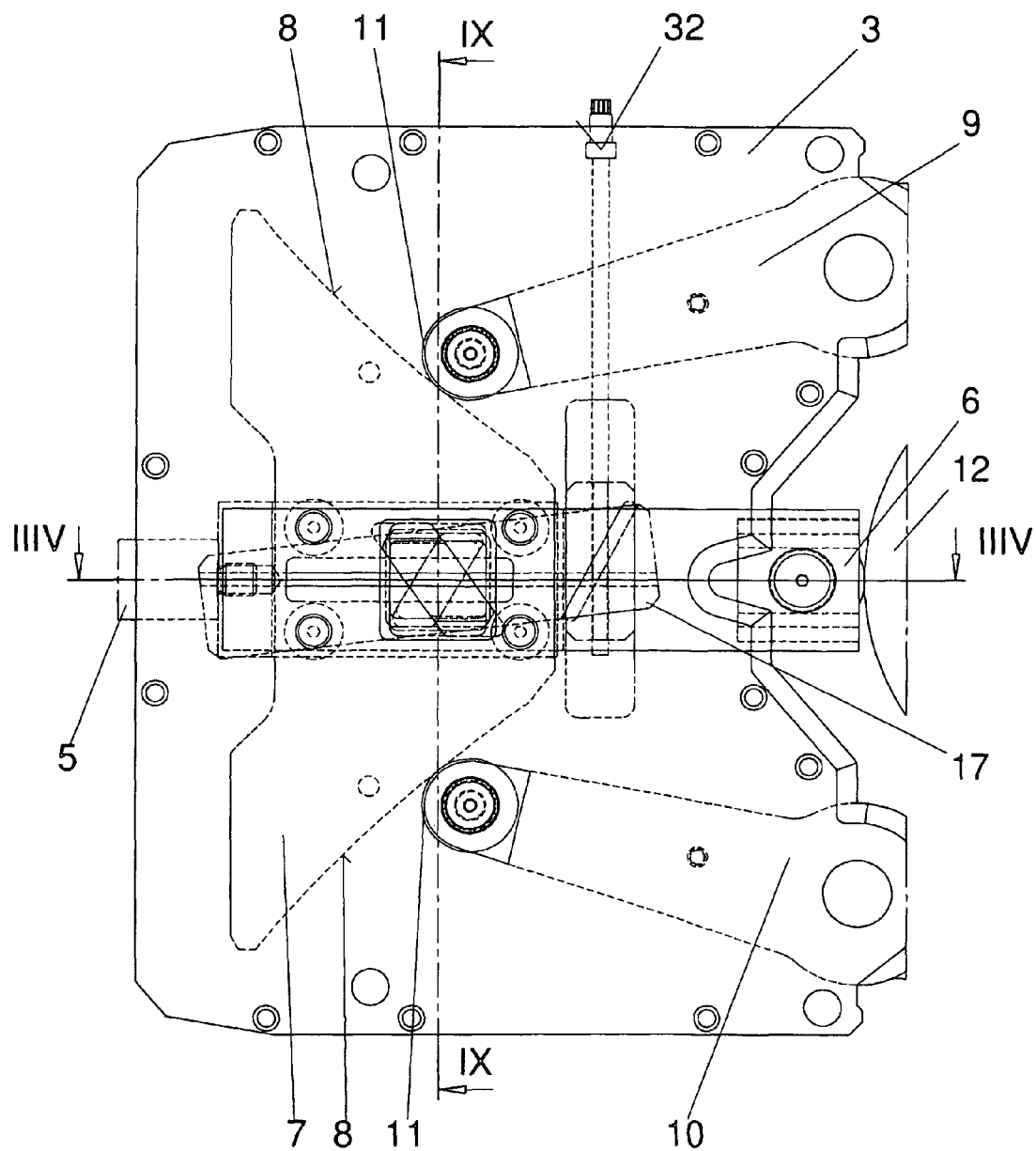
FIG. 7 shows the steady rest in accordance with FIG. 1 in an assembled condition, in a side view.
Figure 8:
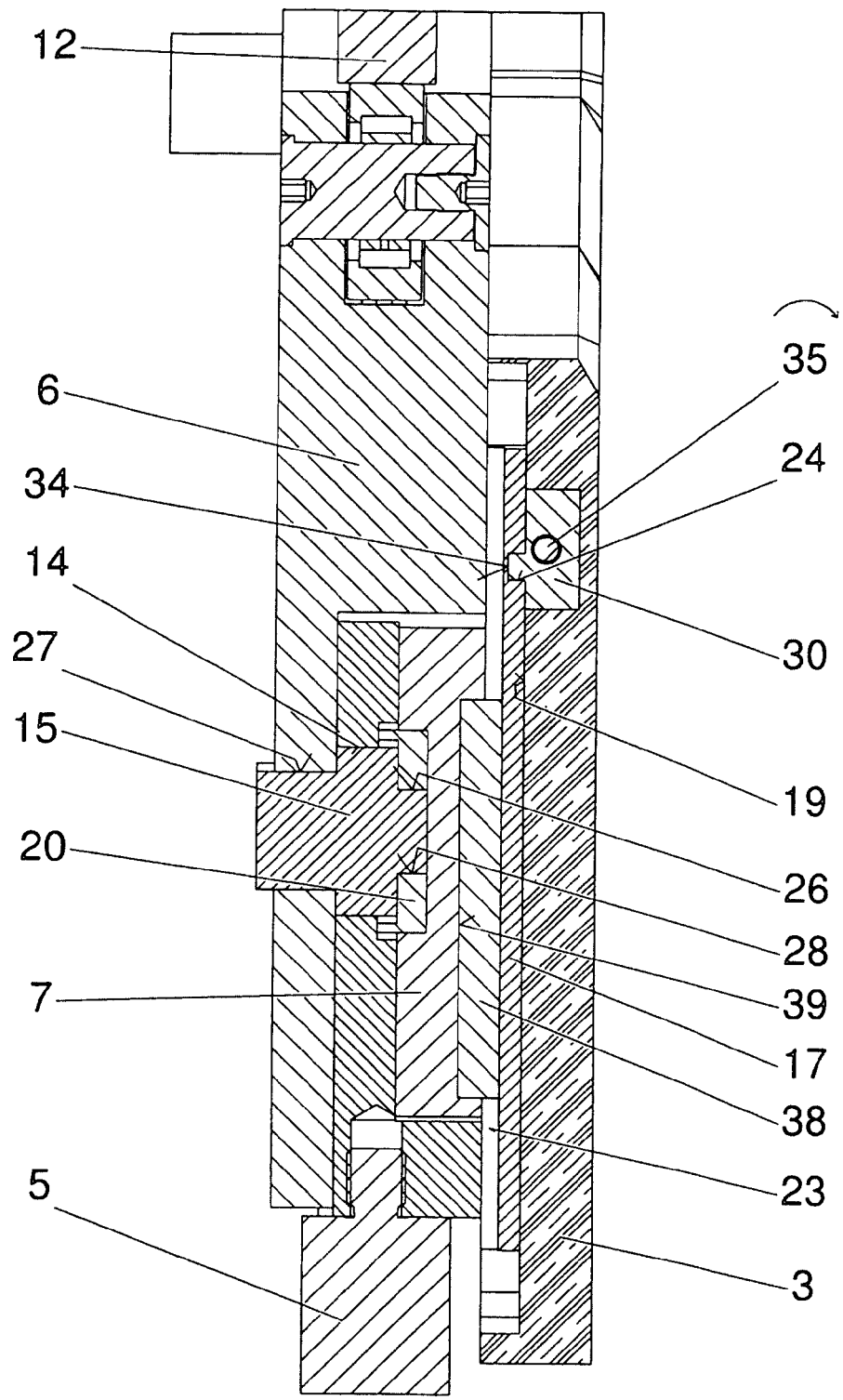
FIG. 8 shows the steady rest in accordance with FIG. 7 along a section line VIII.
Figure 9:
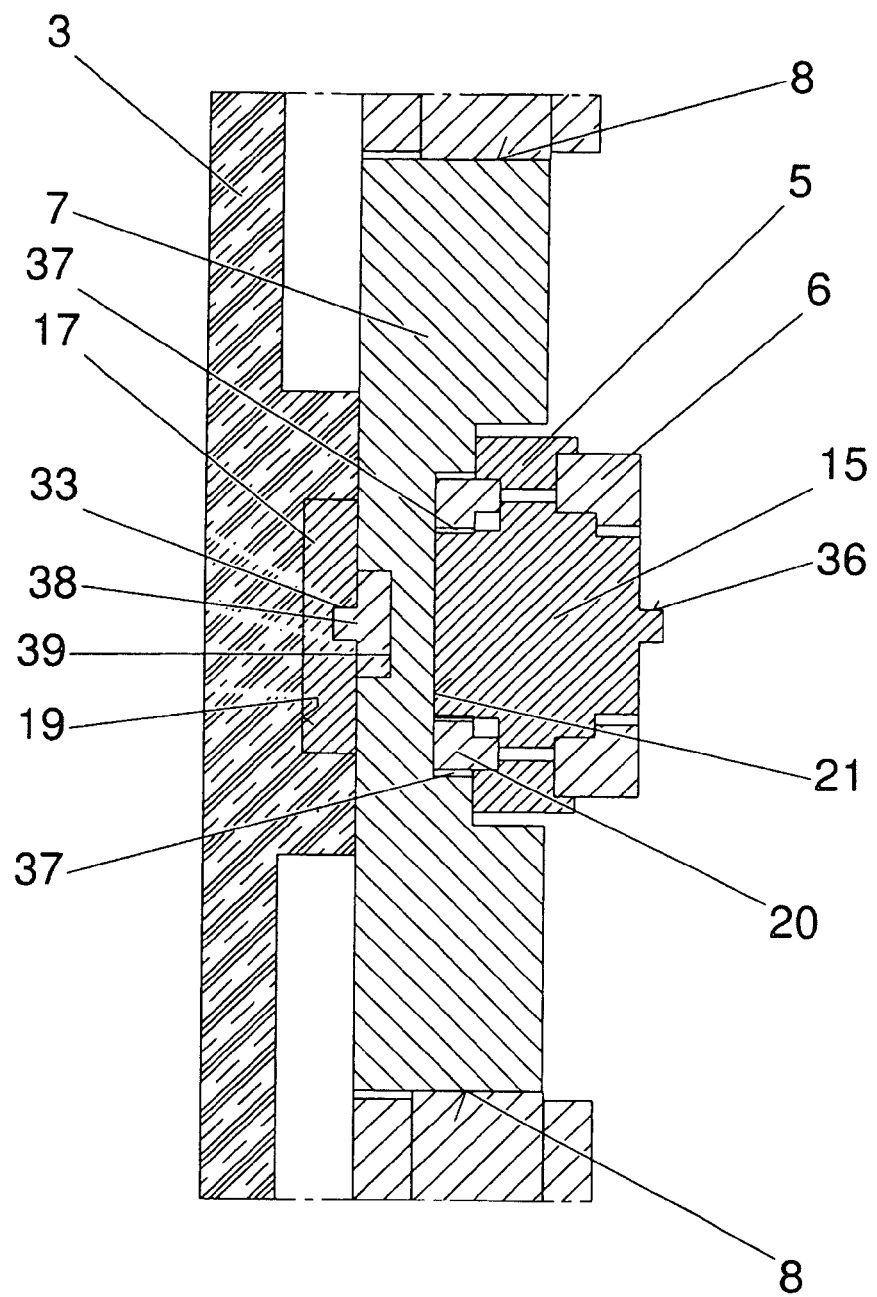
FIG. 9 shows the steady rest in accordance with FIG. 7 along a section line VIIII.

FIGS. 7, 8 and 9 show the steady rest 1 in assembled condition and in the vertical middle position. An air gap 37 is provided between the force actuation element 15, in particular between the moulding 26 and the feed plate 20, as a result of which the outer contour of the force actuation element 15 is at a distance from the inner contour of the feed plate 20, with the effect that the force actuation element 15 can be moved back and forth in the direction of the air gap 37.

FIGS. 8 and 9 in particular show, starting from the actuator rod 35, that the adjustment plate 30 is in a positive-locking active connection with the guide strip, as a result of which the latter undergoes an axial shift due to the helical gearing between the adjustment plate 30 and the guide strip 17 and, as a result of the angled profile of the guide groove 23, the guide slide 7 is raised or lowered in a vertical direction. This movement of the guide slide 7 is not passed on to the force actuation element 15 as a result of the air gap 37, with the effect that the vertical alignment of the guide slide 7 does not entail any change in position of the force actuation element 15.

Figure 10:
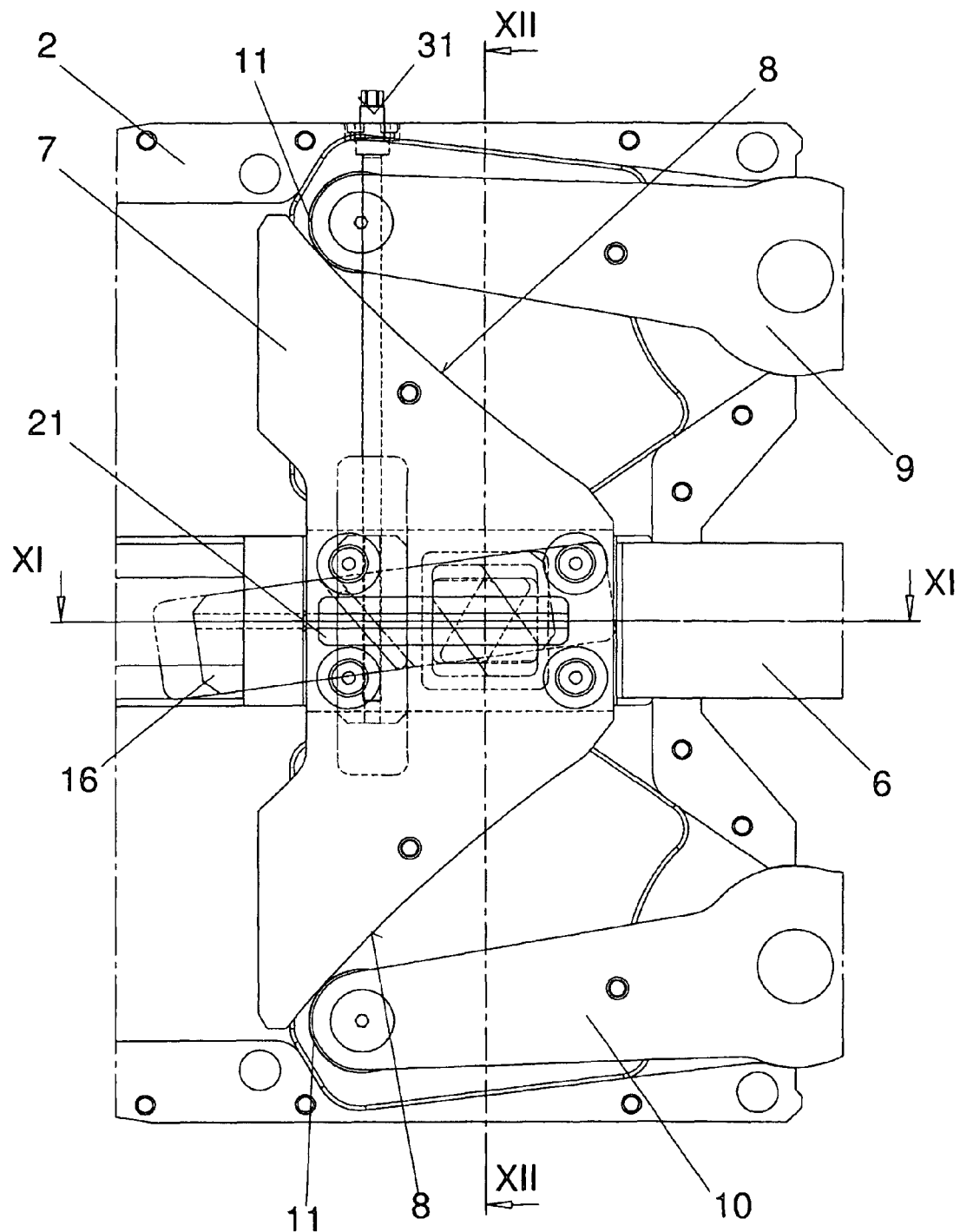
FIG. 10 shows the steady rest in accordance with FIG. 7 in a horizontal central position.
Figure 11:
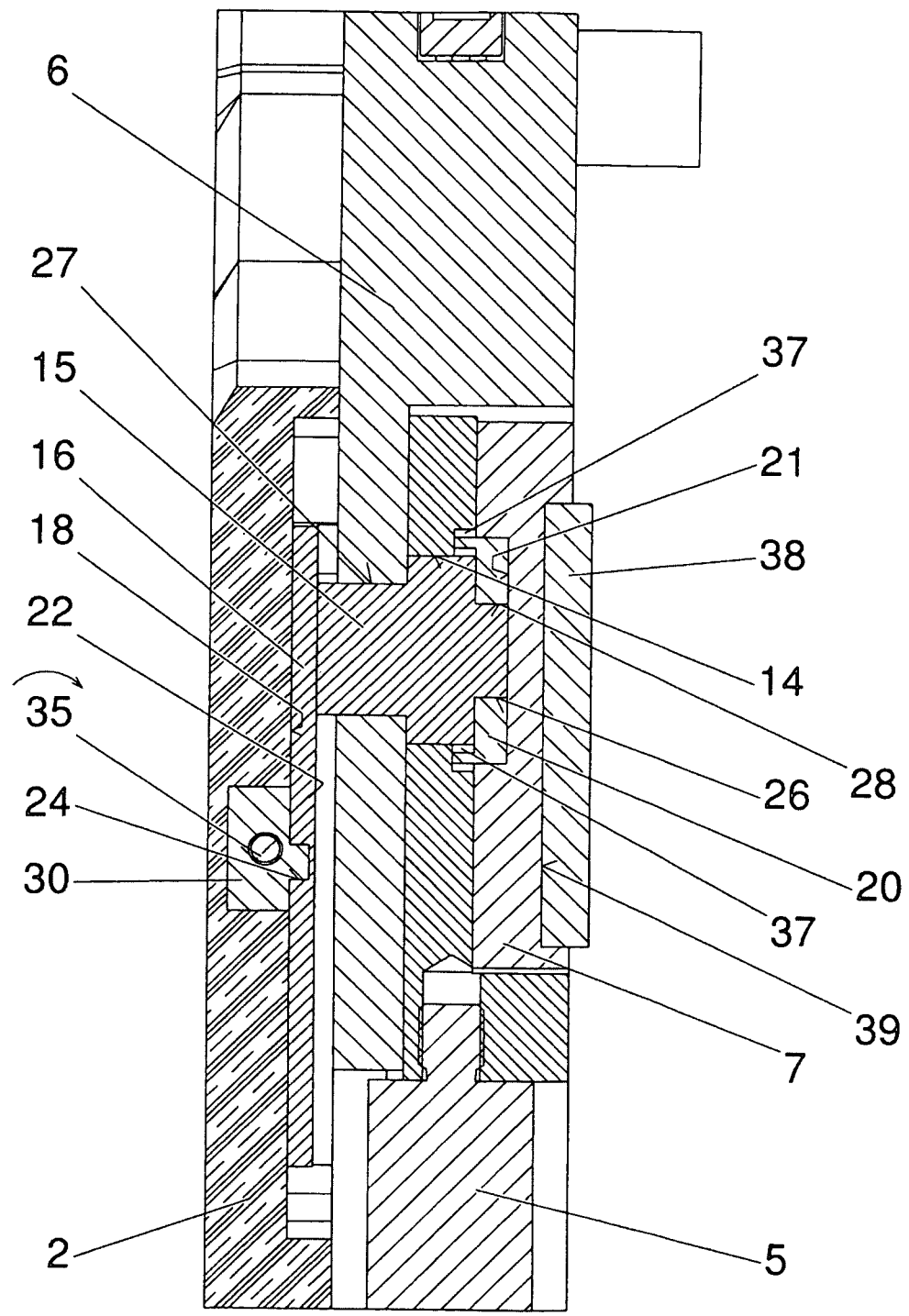
FIG. 11 shows the steady rest in accordance with FIG. 10 along a section line XI-XI.
Figure 12:
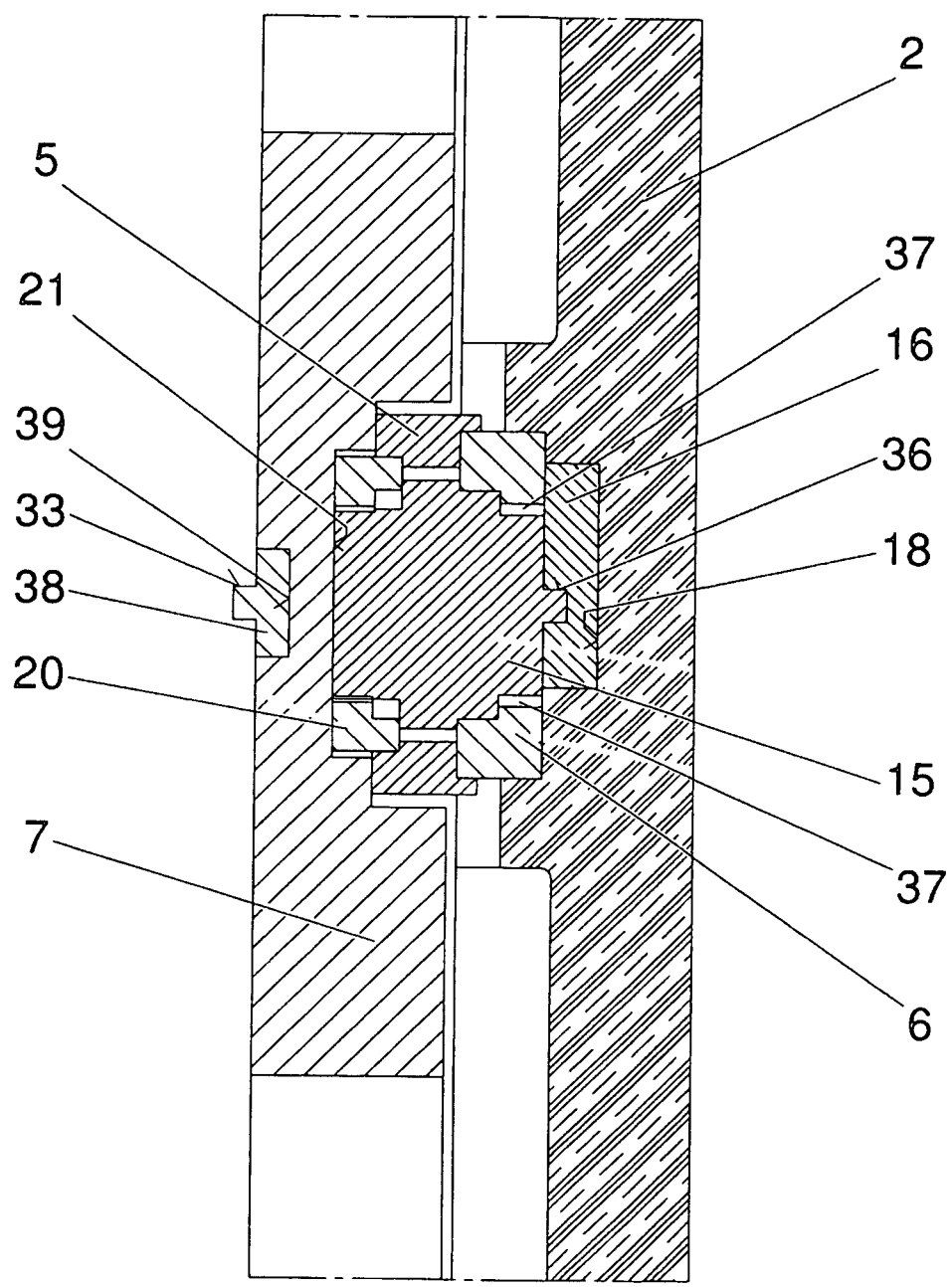
FIG. 12 shows the steady rest in accordance with FIG. 10 along the section line XII-XII.

FIGS. 10, 11 and 12 show the horizontal adjustment of the three steady rest arms 6, 9 and 10. Starting from the horizontal adjustment device 31 and its actuator rod 35, the adjustment plate 30 is once again raised or lowered in a vertical direction, with the effect that the positive-locking active connection in the form of the gearing between the adjustment plate 30 and the guide strip 16 induces an axial shift of the guide strip 16. The angled alignment of the guide groove 22 and the positive-locking connection between the rail 36 and the kidney-shaped moulding 27 means that this adjustment of the guide strip 16 is transferred to the force actuation element 15. This change in position of the force actuation element 15 means that the middle steady rest arm 6 and, by means of the connection between the force actuation element 15 and the feed plate 20, the guide slide 7 is moved in the horizontal plane in the direction of the workpiece 12 or are moved away from it. This slight displacement travel then results in the contact positions of the three steady rest arms 6, 9 and 10 being changed synchronously whilst they are in active contact with the workpiece 12. A simultaneous shift of the three steady rest arms 6, 9 and 10 exclusively shifts the spatial position of the workpiece 12. The clamping condition is not released, and neither is this necessary.

The invention claimed is:

1. A steady rest (1) for centering a rotationally symmetrical workpiece (12) in a space defined by a housing shell (2) and a housing cover (3) firmly connected together to form an interior space (4), the steady rest comprising:
   a guide slide (7) mounted in an axially adjustable arrangement in the interior space (4) and an actuator rod (5) connected to the guide slide (7);
   two control surfaces (8) formed facing opposite to one another on said guide slide (7), the control surfaces (8) being configured such that said guide slide (7) exhibits a triangular cross-sectional contour, one triangle tip of which points towards the workpiece (12) and two triangle tips point towards said actuator rod (5);
   a middle steady rest arm (6) in a driving connection with said actuator rod (5); and
   two outer steady rest arms (9, 10) each arranged on a side adjacent said middle steady rest arm (6) and mounted in a swivelling arrangement in the housing shell (2) and the housing cover (3), and a first free end (11) of which is in contact with said control surface (8) of said guide slide (7), the second free end (13) on the opposite side of said rest arm gripping around the workpiece (12) to be clamped, thus forming a three-point mounting together with said middle steady rest arm (6) in order to hold the workpiece (12),
   wherein
   said actuator rod (5) is provided with a passage opening (14) extending therethrough, into which a force actuation element (15) is disposed, and the force actuation element (15) is in a form-locking active connection with a first and/or second adjustment device (31 and/or 32) by means of intermediate elements (16, 17, 20, 30, 35) such that when the workpiece (12) is clamped, the first adjustment device (31) is adapted to adjust said three steady rest arms (6, 9, 10) jointly and synchronously to one another in position for aligning the workpiece (12) in the clamped condition in the horizontal plane and the second adjustment device (32) is adapted to adjust the position of the two outer steady rest arms (9, 10) for changing the position of the workpiece (12) in the clamped condition in the vertical plane.

2. The steady rest in accordance with claim 1,
   wherein
   two kidney-shaped mouldings (26, 27) are provided on the force actuation element (15) that extend opposite to and intersect one another, and face towards the housing shell (2) or the housing cover (3), respectively.

3. The steady rest in accordance with claim 1,
   wherein
   the force actuation element (15) decouples the adjustment forces arising from the two adjustment devices (31 and/or 32) and decoupling is achieved in that the horizontally acting force proportion of the first adjustment device (31) and the vertical force proportion of the second adjustment device (32) act alternately or jointly on the force actuation element (15) and the force actuation element (15) provides a relative movement between the first and the second adjustment devices (31, 32) or their particular intermediate elements (16, 17, 20, 30, 35).

4. The steady rest in accordance with claim 1,
   wherein
   the horizontal adjustment device (31) comprises an actuator rod (35) arranged in the housing shell (2) at right angles to the movement direction of said actuator rod (5) and mounted in a movable arrangement therein, on the free end of which said actuator rod (35) facing towards the interior space (4) an adjustment plate (30) is disposed, the adjustment plate (30) having a kidney-shaped moulding (34) formed thereon which is angled out of the horizontal plane and faces away from the workpiece (12), the housing shell (2) is provided with a guide groove (18) which is angled from the horizontal plane, into which guide groove (18) an axially adjustable guide strip (16) is disposed and which is provided with a guide groove (22) which is angled out of the horizontal plane, adapted to the moulding (34), in a positive-locking connection with the adjustment plate (30) and extends in an intersecting path angled opposite to the guide groove (18), the guide strip (16) being connected to the middle steady rest arm (6) in the assembled condition, and the force actuation element (15) is provided with a rail formed thereon and mounted in the guide groove (22) in an axially adjustable arrangement in parallel to the lengthways axis.

5. The steady rest in accordance with claim 1,
   wherein
   the force actuation element (15) is provided with a kidney-shaped moulding (26) for vertical adjustment of the workpiece (12) on a side opposite to said actuator rod (5), in which case the moulding (26) is disposed in a feed plate (20) which is provided with a holding groove (28) corresponding to the moulding (26) therein, the feed plate (20) being adapted to be inserted in an opening in said guide slide (7), such that the moulding (27) of the force actuation element (15) projects from a plane formed by said guide slide (7) and the feed plate (20), and is inserted in a positive-locking arrangement in a guide strip (17) provided with a guide groove (23) running at an angle to the horizontal plane, the guide strip (17) being mounted in an axially adjustable arrangement in a guide groove (19) disposed in the housing cover (3) at an angle running opposite to, or intersecting, the guide groove (19), and the guide strip (17) is provided with an angled adjustment groove (24) into which an adjustment plate (30) moveable in a linear direction on the housing cover (3) is inserted with a positive-locking connection provided by a kidney-shaped moulding (34), moveable in a vertical direction by an externally accessible actuator rod (35).

6. The steady rest in accordance with claim 2,
   wherein
   the moulding (27) of the force actuation element (15) facing the housing shell (2) is provided with a rail (36) running in a horizontal direction and which is inserted in an axially adjustable arrangement in the guide groove (22) of the guide strip (16) of the first adjustment device (31).

7. The steady rest in accordance with claim 5,
   wherein
   the groove (28) in the feed plate (20) is provided with a larger lengthways extent than the lengthways extent of the kidney-shaped moulding (26) of the force actuation element (15) and the force actuation element (15) is moveable relative to the feed plate (20) towards the groove-shaped opening (21).

8. The steady rest in accordance with claim 5,
   wherein
   said middle steady rest arm is provided with a groove-shaped opening (21) arranged approximately flush with the passage opening (14) of the actuator rod (5), with parts of the force actuation element (15) passing through the opening (21) in the direction of the guide strip (17) of the first adjustment device (31).

9. The steady rest in accordance with claim 5, wherein the guide groove (19) is disposed in the housing shell (3) at an angle of 3° to 10° from a horizontal plane, the guide groove (23) is arranged in relation to the guide strip (17) at an angle that is of the same magnitude but opposite to the guide groove angle, and a moveable rail (33) is disposed in the guide groove (23).

10. The steady rest in accordance with claim 4, wherein the guide groove (18) is disposed in the housing shell (2) at an angle of 3° to 10° from the horizontal plane, the guide groove (22) disposed in the guide strip (16) extends at an angle of the same magnitude and opposite to, or intersecting, the guide groove angle, and the rail (36) inserted into the guide groove (22) is movable in parallel to the lengthways of axis.

\* \* \* \* \*